(12) United States Patent
Sieber et al.

(10) Patent No.: US 7,718,250 B2
(45) Date of Patent: May 18, 2010

(54) ADHESIVE STRIP FOR THE BONDING OF SHEETING IN THE AREA OF A BUILDING ENVELOPE AND THE USE OF THIS ADHESIVE STRIP

(75) Inventors: Marco Sieber, Horw (CH); Reto Sieber, Sigigen (CH)

(73) Assignee: SILU Verwaltung AG, Meggen (CH)

( * ) Notice: Subject to any disclaimer, the term of this patent is extended or adjusted under 35 U.S.C. 154(b) by 86 days.

(21) Appl. No.: 11/736,308

(22) Filed: Apr. 17, 2007

(65) Prior Publication Data

US 2007/0248816 A1    Oct. 25, 2007

(30) Foreign Application Priority Data

Apr. 19, 2006  (DE) ...................... 10 2006 018 123

(51) Int. Cl.
*B32B 7/12*    (2006.01)
(52) U.S. Cl. ...................... 428/212; 428/220; 428/343; 428/411.1; 428/58; 52/460; 52/309.5; 52/469
(58) Field of Classification Search ................ 428/212, 428/220, 343, 411.1, 58; 52/460, 309.5, 52/469
See application file for complete search history.

(56) References Cited

U.S. PATENT DOCUMENTS

| 3,247,956 | A  | * | 4/1966 | Rosen ......................... 225/90 |
| 6,293,069 | B1 | * | 9/2001 | Monda et al. ................. 52/460 |
| 6,623,594 | B1 | * | 9/2003 | Yamamoto et al. .......... 156/344 |

FOREIGN PATENT DOCUMENTS

| DE | 10134156   | 5/2002 |
| JP | 2002194304 | 10/2002 |
| WO | 01/42384   | 6/2001 |

* cited by examiner

*Primary Examiner*—David R Sample
*Assistant Examiner*—Lawrence D Ferguson
(74) *Attorney, Agent, or Firm*—Fish & Richardson P.C.

(57) ABSTRACT

The invention relates to an adhesive strip for the bonding of sheeting in the area of a building envelope, with a carrier material and an adhesive coating arranged on the carrier material, wherein the adhesive strip is vapor permeable with a diffusion resistance with an $s_d$ value of $\leq 12$ m and the carrier material can elongate elastically with a difference value between the percentage of total elongation under loading $\epsilon_g$ and the percentage of permanent elongation after loading $\epsilon_b$ in the range of 6-80. The invention also relates to the use of such an adhesive strip for the bonding of sheeting in the outer area in house construction.

24 Claims, 1 Drawing Sheet

ADHESIVE STRIP FOR THE BONDING OF SHEETING IN THE AREA OF A BUILDING ENVELOPE AND THE USE OF THIS ADHESIVE STRIP

CROSS-REFERENCE TO RELATED APPLICATIONS

This application claims benefit under 35 U.S.C. §119(a) of German Application No. DE 10 2006 018 123.9 having a Filing Date of Apr. 19, 2006.

FIELD OF THE INVENTION

The invention relates to an adhesive strip for the bonding of sheeting in the area of a building envelope, with a carrier material and an adhesive coating arranged on this carrier material. The invention further relates to a use of such an adhesive strip.

BACKGROUND

In general, in the outer area in house construction, especially on roofs or on facades, sheeting, especially plastic sheeting, or also boards, especially made from hardwood, are installed as so-called "wind resistance" or "rain protection." Such coverings lie above the insulation layer and below the actual outer layer, which is composed, e.g., from bricks, cement-asbestos boards, or the like. As a rule, this cover layer is laid in an overlapping arrangement, with the resulting joints being bonded with one-sided adhesive strips. In this way, penetration of wind, snow, rain, or the like between the outer layer into open joints and production of air currents in the area of the insulation layer can be prevented. Such air currents of cold outside air would reduce the insulation effect, which is to be prevented as much as possible.

In general, for the bonding of sheeting in the outer area in house construction, according to the state of the art usually one-sided adhesive strips are used, which feature, in particular, carriers made from polyethylene sheeting, PVC sheeting, or thermally compressed non-woven spun carrier sheeting.

In general, sheeting or boards used in the outer area in house construction are very vapor permeable, with these usually having an $s_d$ value of $\leqq 1$ m, measured according to DIN 52615. The adhesive strips widely used and known from the state of the art for bonding joints of such boards or sheeting usually exhibit an essentially higher water-vapor diffusion resistance and usually have $s_d$ values that are significantly higher than the corresponding values of sheeting or boards that are used; for example, such values for adhesive strips that are used in the state of the art lie in the range from 20-50 m. In practice, it has been shown in the use of such adhesive strips of the state of the art that for a discharge of diffusing water vapor, e.g., from the roof construction of a house, due to trapped building moisture or residual moisture of construction wood, the moisture in areas, in which there is no joint bonding of the state of the art, can escape easily through the very vapor permeable sheeting or boards, but condensation water can build up along the joint bonding in the area directly under a joint bond with adhesive strips of the state of the art due to the significantly more diffusion-tight adhesive strip in this area. Thus, according to the downward diffusion slope, it can lead to a considerable collection of water, which, as a consequence, can cause rot and structural damage. This is the case, in particular, when more moisture is flowing in from below than can leak out due to the increased diffusion resistance from the joint bonding of the state of the art. Such moisture can involve trapped residual moisture in the roof due to moist construction wood or moisture in the air, which always flows back into the roof construction due to the inner vapor barrier that is not sealed airtight everywhere.

Especially for the use of sheeting as an additional wind and rain protection layer in the outer area in house construction, there is the additional problem that this sheeting must be stretched in webs over the entire roof construction or along the entire width or height of the fagade, so that undulations in individual sheeting webs due to different tensioning can scarcely be avoided. In the area of the joints between two webs, which are tensioned differently or have corresponding undulations, it is thus actually very desirable that adhesive strips be used that provide soft, conforming, and stretching carrier materials that are, however, also sufficiently stable. Otherwise, when laying such sheeting, joint areas that may have been bonded tightly together can detach due to the inherent restoring force of the sheeting material and over time a leakage point can appear in the bonding. Very soft and flexible carrier materials for self-adhesive strips have the advantage that they can continuously conform to all unevenness, but the processability and stability of such carriers often suffers due to the relative softness and excessive flexibility.

Thus, different, actually prohibitive requirements are given with the bonding of sheeting in the outer area in house construction for adhesive strips to be used there.

For example, if one uses an adhesive strip according to the state of the art, which uses as the carrier material a so-called plastic membrane composed of, for example, a polymer sheeting that is mechanically stretched and thus has microscopic openings, such an adhesive strip of the state of the art does obtain permeability, but it loses its stretching ability and elasticity, consequently also its mechanical loading capacity, which has the effect that such an adhesive strip would tear too quickly. In addition, such an adhesive strip would no longer be water tight, because rainwater could pass through the microscopic openings, which could also lead over time to detachment of the adhesive that is used. If one uses as the carrier material for adhesive strips of the state of the art a non-woven carrier, then a high permeability is reached but such an adhesive strip would also no longer be able to conform and as a rule would no longer be water tight. If one uses a coating on such a non-woven carrier, it would be water tight, but it would become even more inflexible and would not conform, which would lead to the problems mentioned above when bonding joints of sheeting in the outer area in house construction.

SUMMARY

Thus, one aspect of the present invention is to provide an adhesive strip, especially for the bonding of sheeting in the area of a building envelope, which overcomes one or more of the disadvantages of adhesive strips of the state of the art. In an embodiment, the invention provides an adhesive strip that is relatively simple in its construction, that nevertheless offers a good sealing effect, water vapor permeability, and mechanical stability and simultaneously sufficient flexibility and conformability.

In an embodiment, this task is accomplished according to the invention by an adhesive strip comprising a carrier material and an adhesive coating on the carrier material, wherein the adhesive strip has a diffusion resistance with an $s_d$ value of less than or equal to about 12 m, and the carrier material can elongate elastically with a difference value between the percentage of total elongation under loading $\epsilon_g$ and the percentage of permanent elongation after loading $\epsilon_b$ in the range from about 6 to about 80.

In an embodiment, an adhesive strip according to the invention can be used for bonding housewrap, that is it can be used for bonding sheeting installed on a building envelope that can serve as a weather-resistive barrier.

DESCRIPTION

Figure 1:
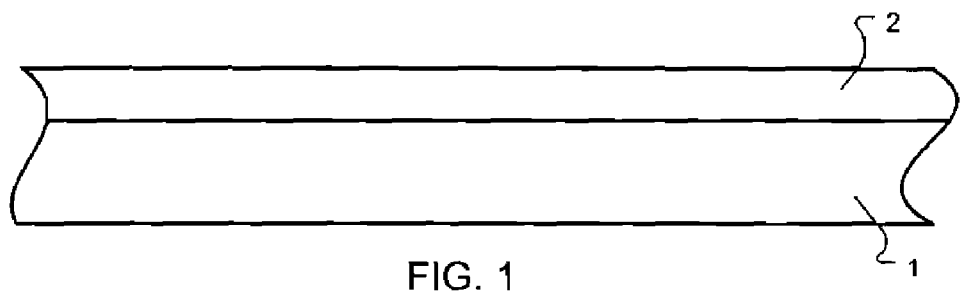
FIG. 1 is a cut-away side view of a section of an adhesive strip according to an embodiment of the invention.

The adhesive strip according to the invention for the bonding of sheeting in the area of a building envelope, especially in the outer area in house construction, has a carrier material and an adhesive coating on this carrier material.

Generally, the adhesive strip according to the invention can be vapor permeable with a diffusion resistance with an $s_d$ value of $\leq 12$ m, measured according to Deutsches Institut für Normung ("DIN") Standard 52615. The specified $s_d$ value relates to the value for the entire adhesive strip composed of the carrier material and adhesive coating. In addition, the carrier material of the adhesive strip can generally elongate elastically with a difference value between percentage of total elongation under loading $\epsilon_g$ and the percentage of permanent elongation after loading $\epsilon_b$ in the range from about 6 to about 80. The corresponding percentage values differ by about 6 to about 80 percentage points in the corresponding difference formation. For example, if a difference from 70% to 10% is formed, then the parameter value according to the invention equals the difference 70%–10%=60 or 60 percentage points. This elastic elongation parameter is referred to herein as "the difference value."

The adhesive strip according to the invention can thus be, first, very vapor permeable and here sufficiently stretchable and stable, which is expressed through the newly discovered parameter according to the invention for the difference value between the percentage of total elongation under loading and the percentage of permanent elongation after loading of a carrier material used for the adhesive strip according to the invention. On one hand, as stated, the mechanical stability can be guaranteed, i.e., the permanent elongation after loading is never less than 6 percentage points and never greater than 80 percentage points different in relation to the percentage of total elongation under loading.

In some embodiments of the invention, the carrier material of the adhesive strip can have a difference value in the range of from about 7 to about 70. In some embodiments of the invention, the carrier material of the adhesive strip can have a difference value in the range of from about 8 to about 65. In some embodiments of the invention, the carrier material of the adhesive strip can have a difference value in the range of from about 12 to about 60.

For determining the elastic elongation properties according to the invention, determination according to DIN standard 53360 is used, wherein a change in length of a 25-mm wide test strip under a static load of 1 kg for 30 min and a change in length after unloading the test strip are determined. For these two values, as performed for the first time according to the invention, a difference from the total elongation and the permanent elongation can be calculated as a parameter, which, as was found according to the invention, can be a good measure for the elastic properties of such a test strip.

Three test bodies of 25-mm width and at least 250-mm length are removed from the carrier material sample longitudinal to the production direction. A measurement length of 100±0.5 mm is drawn on the sample bodies with two thin marks. The drawn measurement marks should be on the sample bodies with the same distance to the sample body ends. The profile of the longitudinal axis is to be drawn at the marks.

The total elongation $\epsilon_g$ of a sample is the ratio of the total change in length $\Delta L_g$ to the original measurement length of the sample body $L_0$. Here, the total change in length $\Delta L_g$ is the difference between the measurement length at constant tensile loading after a certain loading period and the original measurement length of the sample body $L_0$.

The permanent elongation $\epsilon_b$ is the ratio of the permanent change in length $\Delta L_b$ to the original measurement length of the sample body $L_0$. Here, the permanent change in length $\Delta L_b$ after unloading is the difference between the measurement length, after the unloading of the sample body, i.e., after removing the tensile loading after a fixed period and the original measurement length of the sample body $L_0$.

The tests are performed with conditions of 23+/−2 degrees Celsius and a relative air humidity of 50%. The samples are to be acclimated in the same climate for 24 h before the measurements. The 25-mm wide sample strips are mounted on an upper clamping cheek, and the lower end is loaded with a clamp and a weight of 1 kg. After 30 min the distance between the measurement marks, under tensile loading, is read. After unloading, i.e., removing the 1-kg weight, after another 30 min the elongation is measured. The total elongation and the permanent elongation in % can be calculated from these values.

$$\varepsilon_g = \frac{\Delta L_g}{L_0} \cdot 100 \quad (1)$$

$$\varepsilon_b = \frac{\Delta L_b}{L_0} \cdot 100 \quad (2)$$

Then the difference between the total elongation (static elongation) and the permanent elongation are determined.

$$\Delta \epsilon_R, \epsilon_b = \epsilon_R - \epsilon_b \quad (3)$$

Table 1 shows measurement values of the elongations named above. The resulting elongations with loading and the permanent elongation in percentage are reproduced in the corresponding columns. The last column gives the difference between the elongation with loading and the permanent elongation from Equation (3).

TABLE 1

Elastic properties of different sheeting

|  | $L_0$[mm] | $L_g$[mm] | $L_b$[mm] | $\epsilon_g$[%] | $\epsilon_b$[%] | $\Delta\epsilon_g, \epsilon_b$ |
|---|---|---|---|---|---|---|
| ① Erfindungsgemäße Trägerfolie 100 μm | 100.01 | 113.92 | 100.58 | 13.91 | 0.57 | 13.34 |
| ① Erfindungsgemäße Trägerfolie 70 μm | 99.53 | 170.03 | 114.91 | 70.83 | 15.45 | 55.38 |
| ② Polystyrol-Folie 70 μm | 99.52 | 100.11 | 99.98 | 0.59 | 0.46 | 0.13 |
| ③ Polyethylen Folie 40 μm | 100.1 | ⑤ Bruch | — | — | — | — |
| ③ Polyethylen Folie 70 μm | 98.1 | 105.3 | 100.27 | 7.34 | 2.21 | 5.13 |
| ③ Polyethylen Folie 200 μm | 100.9 | 102.38 | 100.15 | 1.47 | −0.74 | 2.21 |
| ④ Polyamid Folie 50 μm | 98.37 | 101.04 | 99.85 | 2.71 | 1.50 | 1.21 |

Key:
① Carrier sheeting according to the invention
② Polystyrene sheeting
③ Polyethylene sheeting
④ Polyamide sheeting
⑤ Break The elastic carrier material samples according to the invention are distinguished in that high values, which are not less than 6, result from the difference between the elongation with loading and permanent elongation. In contrast, conventional carrier materials, such as polyamide or polystyrene, exhibit small values. Thin PE sheeting can be distinguished in that it tears under loading starting at 1 kg or elongates very far and does not retract again. Therefore, for typical polyethylene sheeting, the difference between elongation with loading and permanent elongation remains small.

The carrier material of the adhesive strip according to the invention can be a closed material according to a pinhole test. In some embodiments according to the invention, the carrier material has no perforations, not even through a part of the thickness of the material.

The pinhole test takes place in the following way:

The carrier material according to the invention is coated with a special pinhole-test solution composed of 500 parts turpentine oil, 500 parts petroleum, and 0.5 parts of the dye "Sudan red." With this pinhole-test solution, very small micro-perforations in the sheeting materials can also be detected. For the test of water tightness or for testing whether the carrier material according to the invention preferably involves a closed material, the material to be tested is spread on a white, absorbent material. Then the carrier material is wetted with the pinhole-test solution. The pinhole-test solution is then coated onto the carrier material with a brush. After 5 min, the carrier material is removed and the white, absorbent material underneath is analyzed optically. A red coloring, which can also appear only in some positions, signals that the carrier material involves a material that is not closed, i.e., that has, e.g., micro-perforations, wherein such a carrier material is not water tight. Closed carrier materials in the sense of the preferred embodiment of the invention are distinguished in that during the pinhole test, the absorbent, white material has no red coloring after the test.

In some embodiments according to the invention, the carrier material of the adhesive strip can be water tight for rainwater.

In some embodiments according to the invention, the diffusion resistance of the adhesive strip lies at an $s_d$ value $\leq 10$ m, measured according to DIN 52615. In some embodiments, the diffusion resistance of the adhesive strip lies at an $s_d$ value $\leq 8$ m, measured according to DIN 52615. In some embodiments, the diffusion resistance of the adhesive strip lies at an $s_d$ value $\leq 5$ m, measured according to DIN 52615.

In some embodiments the carrier material of the adhesive strip can be a plastic sheeting with at least one layer. In some embodiments, the carrier material can be a plastic sheeting comprising more than one layer. In some embodiments, the carrier material can be a plastic sheeting comprising 3 layers.

In some embodiments according to the invention, the carrier material can be a plastic sheeting composed of a layer, wherein the layer can be composed at least from ethylene-vinyl acetate (EVA) and a thermoplastic-elastomeric ether-ester block copolymer (TPE-E). In some embodiments, the carrier material further comprises one or more additives chosen from fillers, auxiliary products, sliding agents, anti-blocking agents, and dyes.

In some embodiments according to the invention the carrier material can be a multi-layer plastic sheeting, each layer composed of at least EVA and TPE-E. In some embodiments, the carrier material further comprises one or more additives, and the one or more additives is/are added to only one of the layers. In some embodiments, the TPE-E portion in the one or more layers can equal at least 10 wt %. In some embodiments, the TPE-E portion in the one or more layers can equal at least 25 wt %. The plastic sheeting according to the invention can offer a high and simultaneously precisely adjustable water vapor permeability and mechanical properties that are easily adjustable according to the invention.

The adhesive coating of the adhesive strip according to some embodiments of the invention is chosen from bonding agents, fusing adhesives, dispersion adhesives, solvent adhesives, acrylate adhesives, silicone adhesives, and rubber adhesives. It should be noted that the adhesive coating can be selected such that in interaction with the mechanical properties of the carrier material according to the invention, a correspondingly reliable and permanently acting adhesive strip is provided according to the invention.

In some embodiments, the adhesive strip according to the invention has a thickness of the carrier material ranging from about 40 to about 200 μm. In some embodiments, the thickness ranges from 45 to about 120 μm. In some embodiments, the thickness ranges from about 50 to about 100 μm. In some embodiments, the thickness ranges from about 55 to about 90 μm.

In some embodiments, the adhesive strip according to the invention can have a width in the range of from about 30 to about 1000 mm. In some embodiments, the width ranges from about 35 to about 600 mm. In some embodiments, the width ranges from about 40 to about 400 mm. In some embodiments, the width ranges from about 50 to about 150 mm. Thus, optimum processability can be given under all conditions.

For further mechanical reinforcement, the adhesive strip according to the invention can have a thread material, which in some embodiments can be embedded in the adhesive coating or can be arranged on the side of the carrier material, on which the adhesive coating is also located.

The adhesive strip of the invention, for example in accordance with the previously described embodiments, can be used for the bonding of sheeting in house construction in the outer area, such as in the area of roofs and facades.

Certain embodiments of the invention are illustrated in the following examples. While multiple embodiments of the invention are disclosed herein, still other embodiments may become apparent to those skilled in the art from a review of this specification. As should be realized from a review of the specification, the invention is capable of modifications in various aspects, all without departing from the spirit and scope of the present invention. Accordingly, the drawings and description, including the examples, are to be regarded as illustrative in nature and not in a limiting sense.

EXAMPLES

The invention is explained in more detail below with reference to example embodiments in connection with the enclosed figures.

In a cut-away side view, FIG. 1 shows a section of an adhesive strip according to one embodiment of the invention. Here, an adhesive coating 2 is arranged on a one-layer carrier material 1. The carrier material 1 is constructed, as stated, as a single layer. The carrier material 1 is a closed material, which has no perforations, not even in some sections. The adhesive strip is vapor permeable with a diffusion resistance with an $s_d$ value $\leq 12$ m and the carrier material 1 can elongate elastically with a difference value between the percentage of total elongation under loading $\epsilon_g$ and the percentage of permanent elongation after loading $\epsilon_b$ in the range from 6-80. The adhesive strip according to the invention can be used for the bonding of sheeting in the outer area in house construction, preferably in the area of roofs and facades.

Figure 2:
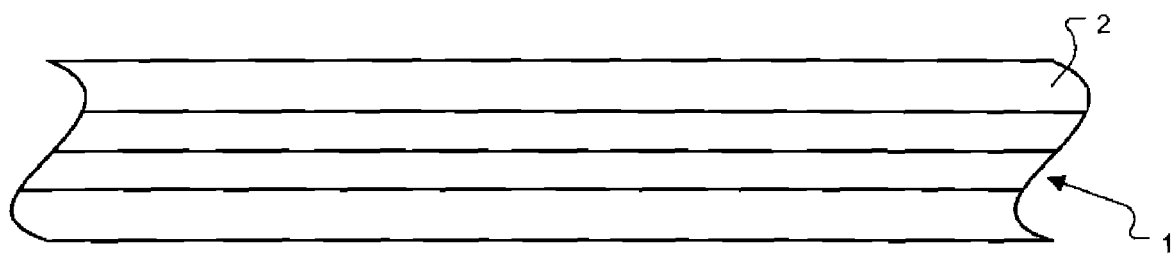
FIG. 2 is a cut-away side view of a section of an adhesive strip according to another embodiment of the present invention.

FIG. 2 shows another preferred embodiment of the adhesive strip according to the invention, wherein the adhesive coating 2 is applied onto a carrier material 1, which is composed of a three-layer construction. Otherwise, the adhesive strip shown in FIG. 2 corresponds in its properties to that shown in FIG. 1, merely with the difference that the carrier material 1 is constructed as a three-layer carrier material. Here it is to be noted that the carrier material 1, as shown in FIG. 2, is a closed material according to the invention, which has no perforations through the entire carrier material 1.

Figure 3:
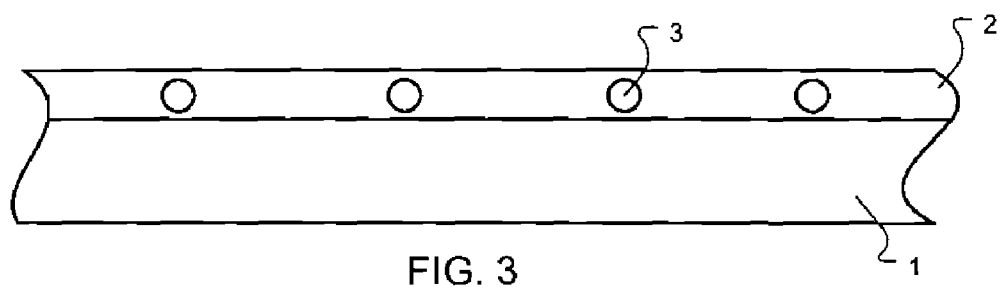
FIG. 3 is a cut-away side view of a section of an adhesive strip according to yet another embodiment of the invention.

FIG. 3 shows another preferred embodiment of an adhesive strip according to the invention in a cut-away sectioned side view. The embodiment shown in FIG. 3 corresponds essentially to the embodiment shown in FIG. 1, wherein a thread material 3 that imparts additional stability is laid as a thread layer in the adhesive coating 2. The arrangement of the thread material can be provided in the form of non-woven threads, woven threads, or some other form.

The adhesive strip according to the invention, which is shown in FIGS. 1-3 in example embodiments, can offer optimum processability for a relative simple form and reliable bonding that is constant over time for sheeting in the outer area in house construction.

What is claimed is:

1. An adhesive strip, comprising: a carrier material having a difference value ranging from about 6 to about 80; and an adhesive coating arranged on the carrier material, wherein the adhesive strip has a width ranging from about 30 to about 1000 mm and an $s_d$ diffusion resistance value of no more than about 12 m as measured according to DIN Standard 52615, and the difference value represents the difference between the percentage of total elongation of the carrier material under loading $\epsilon_g$ and the percentage of permanent elongation of the carrier material after loading $\epsilon_b$, wherein $\epsilon_g$ and $\epsilon_b$ are measured by loading a test body of the adhesive strip having a length of at least 250 mm and a width of 25 mm with a weight of 1 kg, wherein the carrier material comprises one or more layers of plastic sheeting, the plastic sheeting comprising ethylene vinyl acetate (EVA) and a thermoplastic elastomeric ether ester block copolymer (TPE E).

2. An adhesive strip according to claim 1, wherein the difference value ranges from about 7 to about 70.

3. An adhesive strip according to claim 1, wherein the difference value ranges from about 8 to about 65.

4. An adhesive strip according to claim 1, wherein the difference value ranges from about 12 to about 60.

5. An adhesive strip according to claim 1, wherein the carrier material is a closed material as measured by a pinhole test.

6. An adhesive strip according to claim 5, wherein the carrier material has no perforations.

7. An adhesive strip according to claim 1, wherein the carrier material is water tight for rainwater.

8. An adhesive strip according to claim 1, wherein the $s_d$ value is no more than about 10 m as measured according to DIN Standard 52615.

9. An adhesive strip according to claim 1, wherein the $s_d$ value is no more than about 8 m as measured according to DIN Standard 52615.

10. An adhesive strip according to claim 1 wherein the $s_d$ value is no more than about 5 m as measured according to DIN Standard 52615.

11. An adhesive strip according to claim 1, wherein the adhesive coating is chosen from bonding agents, fusing adhesives, dispersion adhesives, solvent adhesives, acrylate adhesives, silicone adhesives, and rubber adhesives.

12. An adhesive strip according to claim 1, wherein the carrier material has a thickness ranging from about 40 to about 200 µm.

13. An adhesive strip according to claim 12, wherein the thickness ranges from about 45 to about 120 µm.

14. An adhesive strip according to claim 13, wherein the thickness ranges from about 50 to about 100 µm.

15. An adhesive strip according to claim 14, wherein the thickness ranges from about 55 to about 90 µm.

16. An adhesive strip according to claim 1, wherein the width ranges from about 35 to about 600 mm.

17. An adhesive strip according to claim 16, wherein the width ranges from about 40 to about 400 mm.

18. An adhesive strip according to claim 17, wherein the width ranges from about 50 to about 150 mm.

19. An adhesive strip according to claim 1, further comprising a thread material.

20. An adhesive strip according to claim 1, wherein at least one of the one or more layers of plastic sheeting comprises at least about 10 weight percent TPE-E.

21. An adhesive strip according to claim 20, wherein at least one of the one or more layers of plastic sheeting comprises at least about 25 weight percent TPE-E.

22. An adhesive strip according to claim 1, wherein the plastic sheeting further comprises one or more additives selected from the group consisting of fillers, auxiliary products, sliding agents, anti blocking agents, and dyes.

23. A method for wrapping a building envelope such as a roof or facade using an adhesive strip comprising:

applying an adhesive strip to a joint between construction materials on a building envelope, the adhesive strip comprising a carrier material having a difference value ranging from about 6 to about 80; and an adhesive coating arranged on the carrier material, wherein the adhesive strip has an $s_d$ diffusion resistance value of no more than about 12 m as measured according to DIN Standard 52615, and the difference value represents the difference between the percentage of total elongation of the carrier material under loading $\epsilon M_g$ and the percentage of permanent elongation of the carrier material after loading $\epsilon_b$, wherein $\epsilon_g$ and $\epsilon_b$ are measured by loading a test body of the adhesive strip having a length of at least 250 mm and a width of 25 mm with a weight of 1 kg, wherein the carrier material comprises one or more layers of plastic sheeting, the plastic sheeting comprising ethylene vinyl acetate (EVA) and a thermoplastic elastomeric ether ester block copolymer (TPE E)

24. A method according to claim 23, further comprising installing a weather-resistive barrier on at least a part of the building envelope.

* * * * *

UNITED STATES PATENT AND TRADEMARK OFFICE
CERTIFICATE OF CORRECTION

PATENT NO. : 7,718,250 B2
APPLICATION NO. : 11/736308
DATED : May 18, 2010
INVENTOR(S) : Marco Sieber and Reto Sieber It is certified that error appears in the above-identified patent and that said Letters Patent is hereby corrected as shown below:

Column 10, line 2 (Claim 23), please delete "$\varepsilon M_g$" and insert --$\varepsilon_g$-- therefor;

Column 10, line 10 (Claim 23) line 6, after "(TPE E)" please insert --.--.

Signed and Sealed this

Twenty-eighth Day of September, 2010

David J. Kappos
*Director of the United States Patent and Trademark Office*